W. N. ALLAN.
VEHICLE WHEEL.
APPLICATION FILED FEB. 21, 1920.

1,364,824.

Patented Jan. 4, 1921.
2 SHEETS—SHEET 1.

WITNESSES:

INVENTOR
William N. Allan,
BY
ATTORNEY

W. N. ALLAN.
VEHICLE WHEEL.
APPLICATION FILED FEB. 21, 1920.
1,364,824.
Patented Jan. 4, 1921.
2 SHEETS—SHEET 2.
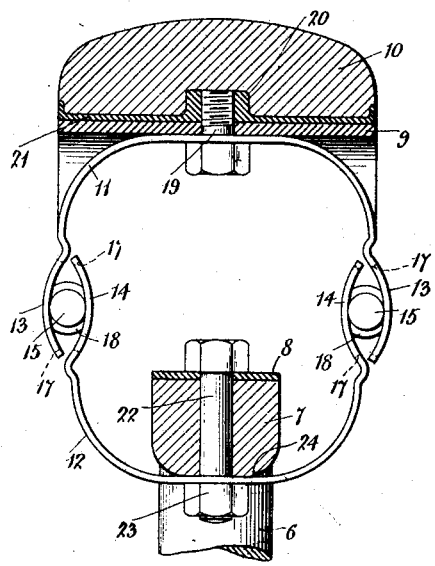
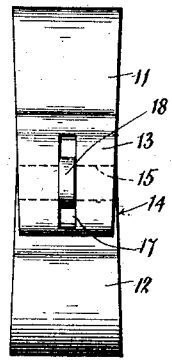
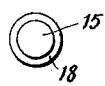
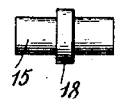
WITNESSES:
INVENTOR
William N. Allan,
BY
ATTORNEY

UNITED STATES PATENT OFFICE.

WILLIAM N. ALLAN, OF SAN ANTONIO, TEXAS.

VEHICLE-WHEEL.

1,364,824.   Specification of Letters Patent.   Patented Jan. 4, 1921.

Application filed February 21, 1920. Serial No. 360,424.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels, and particularly to a tire therefor. The improved tire embodying the subject matter of the present invention is of a simplified spring cushion type wherein a series of bowed spring units are interposed between the wheel felly and tread, and provided with overlapping concavo-convex extremities with intermediate freely movable anti-frictional rollers between and engaging the same, the rollers serving to connect the overlapped extremities of the spring units and permitting the latter to longitudinally slide or shift relatively to each other, to compensate for pressure stresses to which a tire is subjected during its service. The present form of tire organization is very similar to that embodied in my co-pending application, Ser. No. 360,423, filed February 21, 1920.

The invention in the present instance consists in the preferred construction and arrangement of the several parts which will be more fully hereinafter described and claimed.

In the drawings:

Fig. 3 is an enlarged transverse vertical section through the tire and felly.

Fig. 4 is a side elevation of one of the spring units.

Figs. 5 and 6 are detail views of one of the rollers used as the connecting means for the extremities of the spring units.

Figure 1:
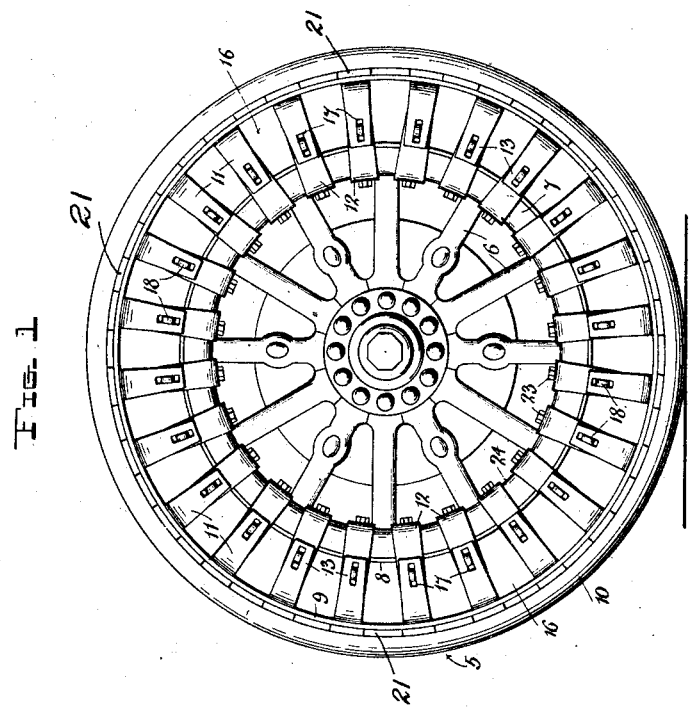
Figure 1 is a side elevation of a wheel embodying the improved tire.
Figure 2:
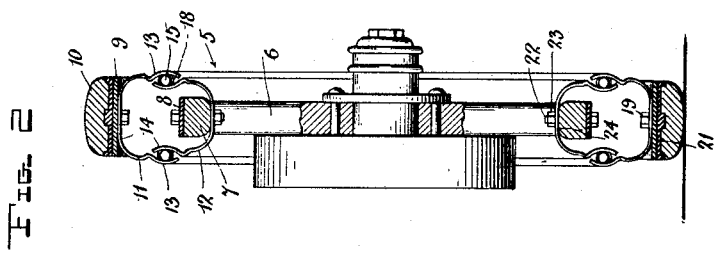
Fig. 2 is a transverse vertical section through the vertical center of the wheel and tire.

The numeral 5 designates a wheel of any suitable construction having spokes 6 and a felly 7 which may be of any preferred form, but in the present instance is shown as having an outer band 8 surrounding and secured to the same. The construction of the wheel and its component felly, however, is not essential and may be varied indefinitely. The present improved tire comprises as its main elements an outer surrounding spring band 9, a solid elastic tread 10 and reversely arranged or opposing spring units 11 and 12 formed with concavo-convex extremities 13 and 14, which normally stand in overlapped relation and are held separated as well as connected by an interposed anti-frictional roller 15. The spring units 11 and 12 are regularly disposed around the felly between the latter and the spring band 9, as clearly shown by Fig. 1, the several pairs of units being spaced apart to provide openings 16 therebetween and whereby the improved tire is thoroughly ventilated as well as lightened in construction. The number of the spring units 11 and 12, applied to the felly 7, and between the latter and the band 9 and tread 10, may be varied and their general dimensions modified in accordance with the character of the wheel with which they are used, or the load that is intended to be imposed upon the wheel. Each concavo-convex extremity 13 or 14 forms a jaw, the jaws 14 of each inner unit 12 being disposed inside of the jaws 13 of the outer unit 11, and both jaws have central longitudinal slots 17, one in each, the two slots of each pair of opposing jaws being in alinement. Each roller 15 has a central rib 18 circumscribing the same, and the ribs 18 of the rollers 15 engage the slots 17, the slots being of such length as to permit the rollers to shift longitudinally between the opposing extremities of the jaws 13 or 14. It is obvious that the ribs 18 of the rollers 15 serve to hold the rollers in place and in regular positions between the jaws 13 and 14, and when the several rollers 15 are applied between the jaws, as shown, the said jaws are held in spaced relation at a sufficient distance to permit them to freely pass each other during the compression and relaxation operations of the spring units.

Various types of fastening means could be used for attaching the spring units 11 and 12, respectively, to the band 9 and tread 10 and the felly 7, and for the purpose of illustrating one simple means that may be adopted with advantage, each spring unit is shown as having a threaded bolt 19 inserted through the center thereof, and through the band 9 and then extending into a socket 20 of a transverse plate 21, included in the tread organization, or serving as means for holding the tread 10 reliably applied and in place on the band 9. The bolt 19 has an inner head of usual form and of suitable dimensions to bear against the spring unit 11. The spring unit 11 is normally bowed, but the spring unit 12 is primarily straight and the ends thereof are sprung inwardly to permit the extremities of the spring unit 11 to be disposed thereover, and, as hereinbefore explained, the spring unit extremities or jaws 13 and 14 are held in spaced relation and connected by interposed rollers 15. Each spring unit 12 is secured against the inner side or periphery of the inner felly 7 by a bolt 22 inserted through the center of the felly and having a nut 23 applied to its inner screw-threaded end and bearing against the intermediate portion of said spring unit 12. The inner side or periphery 24 of the felly 7 is curved to permit the portions of the spring unit 12, adjacent to opposite sides thereof, to have unrestricted movement and to obviate bringing the said spring unit into contact with sharp corners or angles.

When the tire is subjected to pressure stresses in traveling over a road surface, the spring units 11 and 12 coöperate expansively at the extremities or jaws 13 and 14, the jaws 14 following the movements of the jaws 13 and at the same time the pairs of jaws of each pair of spring units have a longitudinal sliding operation relatively to each other, and when compression stress is relieved from successive portions of the tire, the spring units resume their normal positions, as shown. During the movements of the jaws 13 and 14 the rollers 15 freely shift to ease the movement of the spring jaws and at the same time always maintain them in positive spaced relation, and during the shifting movement of the rollers 15, the ribs 18 will ride in the slots 17. The improved tire is augmented in its resiliency by the spring band which materially assists also in restoration of the parts of the tire to normal position after it has been relieved of compression stress or strain.

What is claimed as new is:

1. A tire comprising opposing spring units with overlapping ends of concavo-convex form, and cylindrical rollers interposed between the said ends and holding them in spaced relation for relative reciprocation.

2. A tire comprising opposed spring units having overlapped extremities formed as concavo convex jaws, the opposing jaws having longitudinal slots therein, and rollers interposed between the jaws and provided with ribs engaging the slots.

3. A tire comprising opposing spring units with reversely overlapping curved extremities, and cylindrical rollers interposed and freely movable between the said extremities, and provided with means for preventing them from shifting out of place sidewise between said extremities.

4. A tire comprising opposed spring units with overlapping concavo-convex ends provided with central longitudinal slots, and rollers interposed between the said ends and having central circumscribing ribs engaging the said slots.

5. The combination with a felly and a tread organization including a surrounding spring band, of groups of opposed bowed spring units having overlapping extremities of reversely curved contour, the one unit of each group being secured to the spring band and tread organization and the other unit of the same group being secured to the felly, and cylindrical rollers interposed and freely movable between the said overlapping extremities.

6. Groups of resilient means for a spring tire consisting of opposed bowed spring units having overlapping freely reciprocating extremities of reversely curved contour, and rollers movably interposed between said reversely curved extremities.

In testimony whereof I have hereunto set my hand.

WILLIAM N. ALLAN.